(12) United States Patent
Takata et al.

(10) Patent No.: US 11,072,234 B2
(45) Date of Patent: Jul. 27, 2021

(54) STRADDLED VEHICLE

(71) Applicant: YAMAHA HATSUDOKI KABUSHIKI KAISHA, Iwata (JP)

(72) Inventors: Kazunari Takata, Shizuoka (JP); Yasuo Miyake, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 8 days.

(21) Appl. No.: 16/387,580

(22) Filed: Apr. 18, 2019

(65) Prior Publication Data
US 2019/0329647 A1  Oct. 31, 2019

(30) Foreign Application Priority Data
Apr. 26, 2018  (JP) .............................. JP2018-085011

(51) Int. Cl.
*B60K 15/035*  (2006.01)
*B60K 15/063*  (2006.01)
(Continued)

(52) U.S. Cl.
CPC ...... *B60K 15/03504* (2013.01); *B60K 15/063* (2013.01); *F02M 25/0854* (2013.01);
(Continued)

(58) Field of Classification Search
CPC ............ B60K 15/03504; B60K 15/063; B60K 2015/03328; B60K 2015/03514;
(Continued)

(56) References Cited

U.S. PATENT DOCUMENTS 6,331,021 B1 * 12/2001 Wilson ................. B60K 15/035
                                                   285/226
2009/0159055 A1 * 6/2009 Ohhira ................. F02M 25/089
                                                   123/519
(Continued)

FOREIGN PATENT DOCUMENTS

JP        2001234761 A   *  8/2001
JP        4276982 B2     *  6/2009
(Continued)

OTHER PUBLICATIONS

JP-2001234761-A—Kuwano et al.—Module for Internal Combustion Engine and Intake Device—English Translation (Year: 2001).*
(Continued)

*Primary Examiner* — Joseph J Dallo
*Assistant Examiner* — Scott A Reinbold
(74) *Attorney, Agent, or Firm* — Keating and Bennett, LLP

(57) ABSTRACT

A straddled vehicle includes a vehicle body frame supporting a front wheel and a rear wheel, a seat fixed to the vehicle body frame, an engine, a fuel tank, and a canister to adsorb vaporized gas generated by evaporation of a fuel inside the fuel tank. The engine includes a crankshaft that rotates around a crank axis extending in the left-right direction and located lower than the seat. The fuel tank is located farther forward than the seat and higher than the engine. The canister is connected to the fuel tank through a gas pipe. The canister is located farther forward than the crank axis and lower than the fuel tank.

10 Claims, 15 Drawing Sheets

(51) Int. Cl.
*F02M 25/08* (2006.01)
*B60K 15/03* (2006.01)

(52) U.S. Cl.
CPC ............ *F02M 25/0872* (2013.01); *B60K 2015/03328* (2013.01); *B60K 2015/03514* (2013.01); *B60K 2015/0637* (2013.01); *B60Y 2200/124* (2013.01)

(58) Field of Classification Search
CPC ....... B60K 2015/0637; F02M 25/0854; F02M 25/0872; B60Y 2200/124
USPC ......................................................... 123/519
See application file for complete search history.

(56) References Cited

U.S. PATENT DOCUMENTS

| | | | |
|---|---|---|---|
| 2009/0243248 A1* | 10/2009 | Nakamura | B60G 3/20 280/124.135 |
| 2014/0262584 A1* | 9/2014 | Lovold | B60K 13/04 180/246 |
| 2016/0185211 A1 | 6/2016 | Nakamura et al. | |
| 2016/0229476 A1* | 8/2016 | Yasuta | B62J 35/00 |
| 2017/0089303 A1* | 3/2017 | Kurata | B60K 15/073 |
| 2017/0334285 A1 | 11/2017 | Tanaka | |

FOREIGN PATENT DOCUMENTS

| | | |
|---|---|---|
| JP | 2015174600 A * | 10/2015 |
| JP | 2017-210032 A | 11/2017 |

OTHER PUBLICATIONS

JP-4276982-B2—Yamamoto et al.—Fuel cutoff valve- English Translation (Year: 2009).*

JP-2015174600-A—Takahisa et al.—Canister Arrangement Structure of Saddle Riding Type Vehicle—English Translation (Year: 2015).*

* cited by examiner

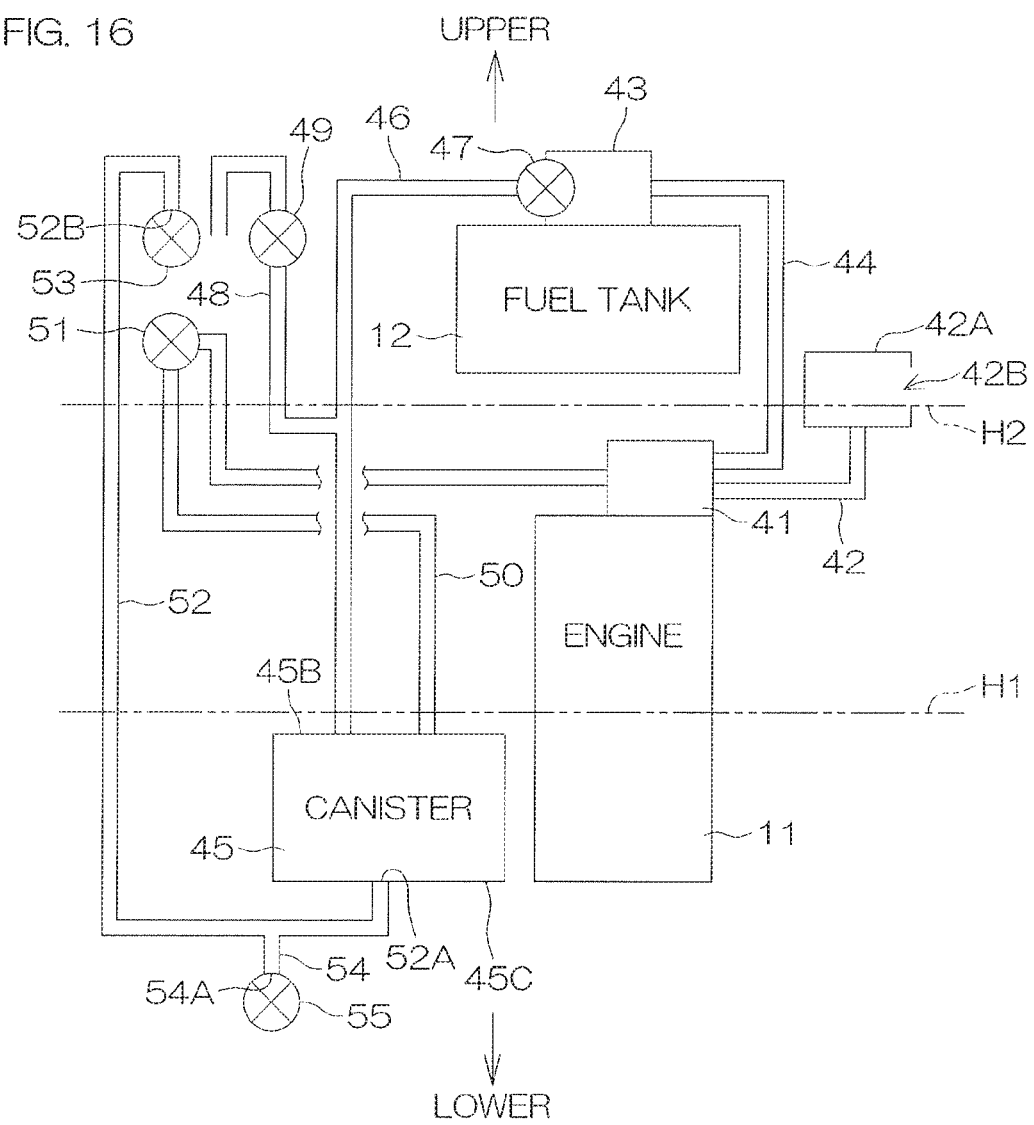

STRADDLED VEHICLE

CROSS REFERENCE TO RELATED APPLICATIONS

This application claims the benefit of priority to Japanese Patent Application No. 2018-085011 filed on Apr. 26, 2018. The entire contents of this application are hereby incorporated herein by reference.

BACKGROUND OF THE INVENTION

1. Field of the Invention

The present invention relates to a straddled vehicle including a canister that adsorbs vaporized gas generated by evaporation of a fuel inside a fuel tank.

2. Description of the Related Art

A straddled irregular ground traveling vehicle described in Japanese Patent Application Publication No. 2017-210032 includes a vehicle body frame, front wheels and rear wheels respectively provided on front portions and rear portions of the vehicle body frame, an engine located between the front wheels and the rear wheels, a fuel tank, a seat, and a canister. The fuel tank is located above the engine and ahead of the seat. The canister is located at the rear side of the engine, and fixed to the vehicle body frame.

The straddled vehicle described in Japanese Patent Application Publication No. 2017-210032 is a multi-purpose vehicle, so that there is an extra space at the rear side of the engine, and a canister is able to be located using this space. However, for example, a straddled vehicle for sports traveling is more compact than the straddled vehicle described in Japanese Patent Application Publication No. 2017-210032, so that there is no extra space at the rear side of the engine. Therefore, when the canister is located near the fuel tank above the engine, a capacity of the fuel tank decreases according to the location space of the canister.

SUMMARY OF THE INVENTION

In order to overcome the previously unrecognized and unsolved challenges described above, preferred embodiments of the present invention provide straddled vehicles each including a vehicle body frame, a seat, an engine, a fuel tank, and a canister. The vehicle body frame supports a front wheel and a rear wheel. The seat is fixed to the vehicle body frame, and an occupant sits on the seat. The engine includes a crankshaft that rotates around a crank axis extending in the left-right direction and located lower than the seat. The fuel tank stores fuel for the engine, and is located farther forward than the seat and higher than the engine. The canister adsorbs vaporized gas generated by evaporation of the fuel inside the fuel tank, and is connected to the fuel tank through a gas pipe. The canister is located farther forward than the crank axis, and lower than the fuel tank.

With the above structural arrangement, a space to locate the canister farther forward than the crank axis, which extends in the left-right direction of the engine and lower than the fuel tank, and lower than the fuel tank does not influence the capacity of the fuel tank. Therefore, without decreasing the capacity of the fuel tank, the canister is able to be provided.

In a preferred embodiment of the present invention, the straddled vehicle further includes a swing arm which is located farther rearward than the engine and attached to the vehicle body frame in a swingable manner, and to which the rear wheel is attached. With this structural arrangement, because the straddled vehicle includes the swing arm, even in a straddled vehicle in which it is difficult to secure a location space for the canister farther rearward than the engine, the canister is able to be located without decreasing the capacity of the fuel tank.

In a preferred embodiment of the present invention, the straddled vehicle further includes a cover. The cover is located so as to sandwich the canister with the engine, and covers at least a portion of the canister from a lateral outer side of the straddled vehicle. This structural arrangement makes it possible for the cover to prevent an occupant seated on the seat from touching the canister from the lateral outer side.

In a preferred embodiment of the present invention, the straddled vehicle further includes a clip. The clip is located at a lateral inner side of the straddled vehicle with respect to the cover, and connects the gas pipe to the canister. With this structural arrangement, the clip is located so as to be concealed on a lateral inner side of the cover, and this makes it possible to prevent the gas pipe from coming off the canister in response to accidental contact with the clip from a lateral outer side.

In a preferred embodiment of the present invention, the straddled vehicle further includes a fuel pump and a shut-off valve. The fuel pump pumps fuel out of the fuel tank and supplies the fuel to the engine. The shut-off valve is integral with the fuel pump, and shuts the gas pipe off in response to the straddled vehicle tilting at a predetermined angle or more with respect to the vertical direction. With this structural arrangement, when the straddled vehicle tilts at the predetermined angle or more with respect to the vertical direction, the shut-off valve makes it possible to prevent liquid fuel inside the fuel tank from flowing into the canister through the gas pipe. The shut-off valve is integral with the fuel pump, so that a bracket, etc., that is used to fix a position of the shut-off valve is able to be omitted.

In a preferred embodiment of the present invention, the straddled vehicle further includes a breather pipe, and an intake valve or an air cleaner located higher than upper ends of the front wheel and the rear wheel. The breather pipe includes an inlet connected to the canister and an outlet open to the atmosphere. The intake valve opens and closes the outlet. The air cleaner traps foreign matter from air flowing from the outlet to the inside of the breather pipe.

With this structural arrangement, the breather pipe connected to the canister is open to the atmosphere at the outlet. The intake valve prevents foreign matter from entering the inside of the breather pipe from the outlet by closing the outlet. Alternatively, the air cleaner traps foreign matter from air flowing into the breather pipe from the outlet. Further, the intake valve and the air cleaner are located higher than the upper ends of the front wheel and the rear wheel. Accordingly, even in the case of off-road traveling of the straddled vehicle, foreign matter such as dust and water hardly reach the intake valve and/or the air cleaner. The structural arrangement described above makes it possible to prevent foreign matter from entering the canister from the outlet through the inside of the breather pipe.

In a preferred embodiment of the present invention, the straddled vehicle further includes an intake passage including an air inlet. The intake passage supplies air from the air inlet to the engine. The outlet is located at the same or substantially the same height position as the air inlet, or higher than the height position. With this structural arrangement, the air inlet of the intake passage is generally located higher than a water level assumed in a case where the straddled vehicle is immersed in water. Therefore, the outlet of the breather pipe located at a height position equal to or higher than a height position of the air inlet is also located higher than the assumed water level. Therefore, when the straddled vehicle is immersed in water, it is possible to prevent water from entering the inside of the canister through the breather pipe.

In a preferred embodiment of the present invention, the straddled vehicle further includes an exterior component covering the outlet. With this structural arrangement, the outlet of the breather pipe is covered by the exterior component, and accordingly, the outlet is not exposed to the outside of the straddled vehicle. Therefore, foreign matter present outside the straddled vehicle hardly reaches the outlet. Therefore, it is possible to prevent foreign matter from entering the canister from the outlet through the inside of the breather pipe.

In a preferred embodiment of the present invention, the straddled vehicle further includes a drain pipe. The drain pipe is located lower than the canister, and branches from the breather pipe and extends downward. The drain pipe includes a drain hole at a lower end thereof. With this structural arrangement, even when a liquid fuel inside the fuel tank or water outside flows into the canister, it is possible to make these liquids flow from the breather pipe to the drain pipe and be discharged to the outside of the straddled vehicle from the drain hole.

In a preferred embodiment of the present invention, the straddled vehicle further includes a backflow valve to prevent a backflow from the drain hole into the drain pipe. With this structural arrangement, it is possible to prevent water outside the straddled vehicle from flowing into the drain pipe from the drain hole with the backflow valve. Therefore, it is possible to prevent water from flowing into the breather pipe from the drain pipe, and this makes it possible to prevent water from entering the inside of the canister from the drain pipe.

In a preferred embodiment of the present invention, the straddled vehicle further includes a throttle body, a purge pipe, and a purge cut valve. The throttle body is located higher than the upper ends of the front wheel and the rear wheel, and is connected to the engine. The purge pipe supplies vaporized gas inside the canister to the throttle body, and connects the canister and the throttle body. The purge cut valve is integral with the throttle body, and opens and closes the purge pipe.

With this structural arrangement, during operation of the engine, by the engine sucking air inside the purge pipe, outside air is sucked from the breather pipe, and supplied to the canister. Fuel adsorbed by the canister is released into the outside air, and becomes vaporized gas. When the purge cut valve opens the purge pipe, the vaporized gas is supplied to the engine through the purge pipe and the throttle body, and is purged in the engine. In this way, fuel adsorbed by the canister is able to be utilized for operation of the engine. The purge cut valve is integral with the throttle body, and this makes it possible to omit a bracket, etc., used to fix the position of the purge cut valve.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 16 is a schematic view to describe a fuel system according to a third preferred embodiment of the present invention.

DETAILED DESCRIPTION OF THE PREFERRED EMBODIMENTS

Hereinafter, preferred embodiments of the present invention are described in detail with reference to the accompanying drawings. In the following description, the front-rear, the left-right, and the up-down are directions defined based on a viewpoint of an occupant seated on a seat of a straddled vehicle when facing a steering bar. The left-right direction is a vehicle width direction of the straddled vehicle. Description is provided based on a state where the straddled vehicle is placed on a horizontal plane.

Figure 1:
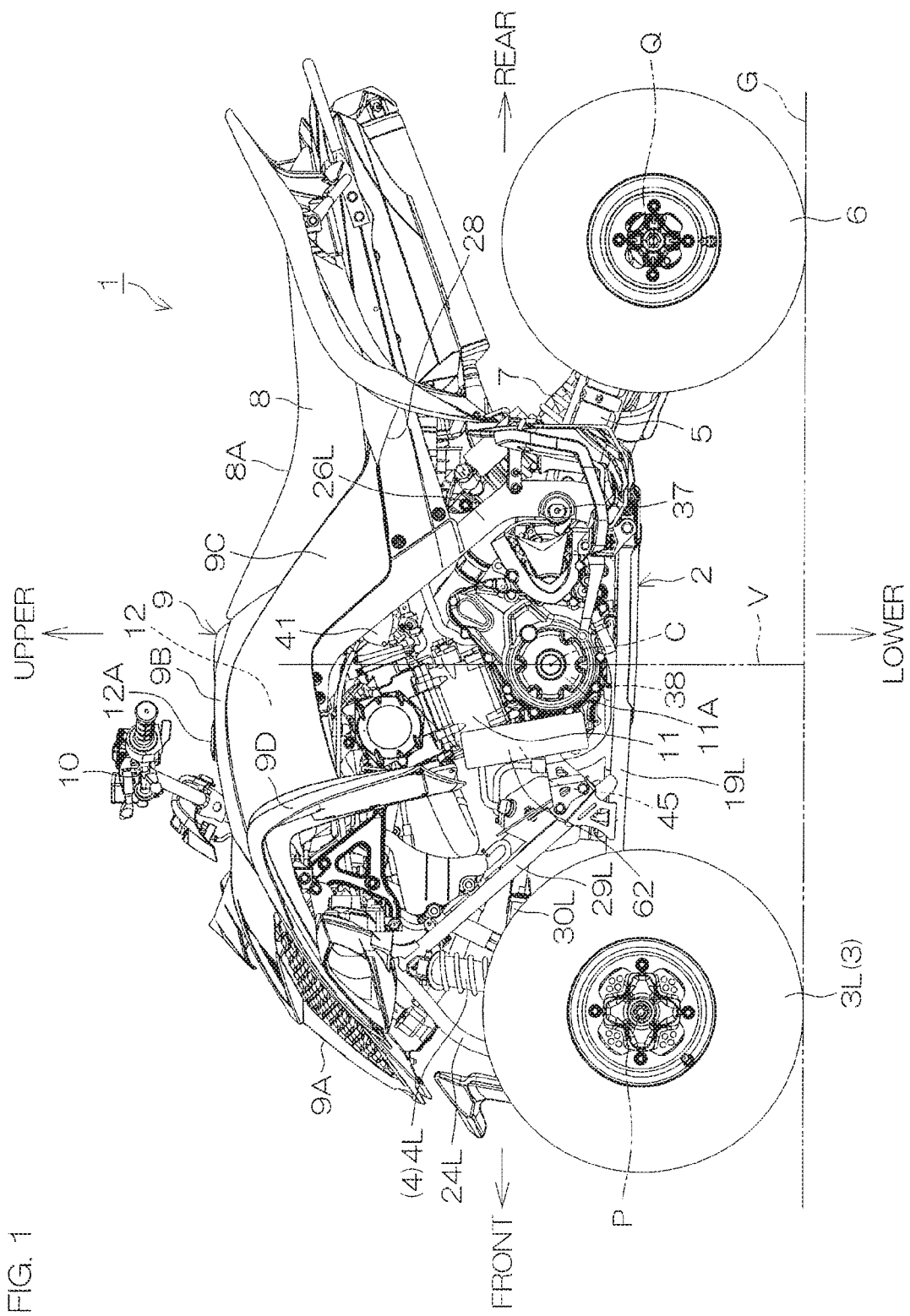
FIG. 1 is a left side view of a straddled vehicle according to a first preferred embodiment of the present invention.

FIG. 1 is a left side view of a straddled vehicle 1 (hereinafter, referred to as "vehicle 1") according to a first preferred embodiment of the present invention. The vehicle 1 preferably belongs to the category of utility vehicles, for example, and, more specifically, may be an all-terrain vehicle (ATV) that travels in forests and deserts, etc. The vehicle 1 includes a vehicle body frame 2, pairs of left and right front wheels 3 and front shock absorbers 4, a swing arm 5, a pair of left and right rear wheels 6, a rear shock absorber 7, a seat 8, an exterior component 9, a steering bar 10, an engine 11, and a fuel tank 12.

Figure 2:
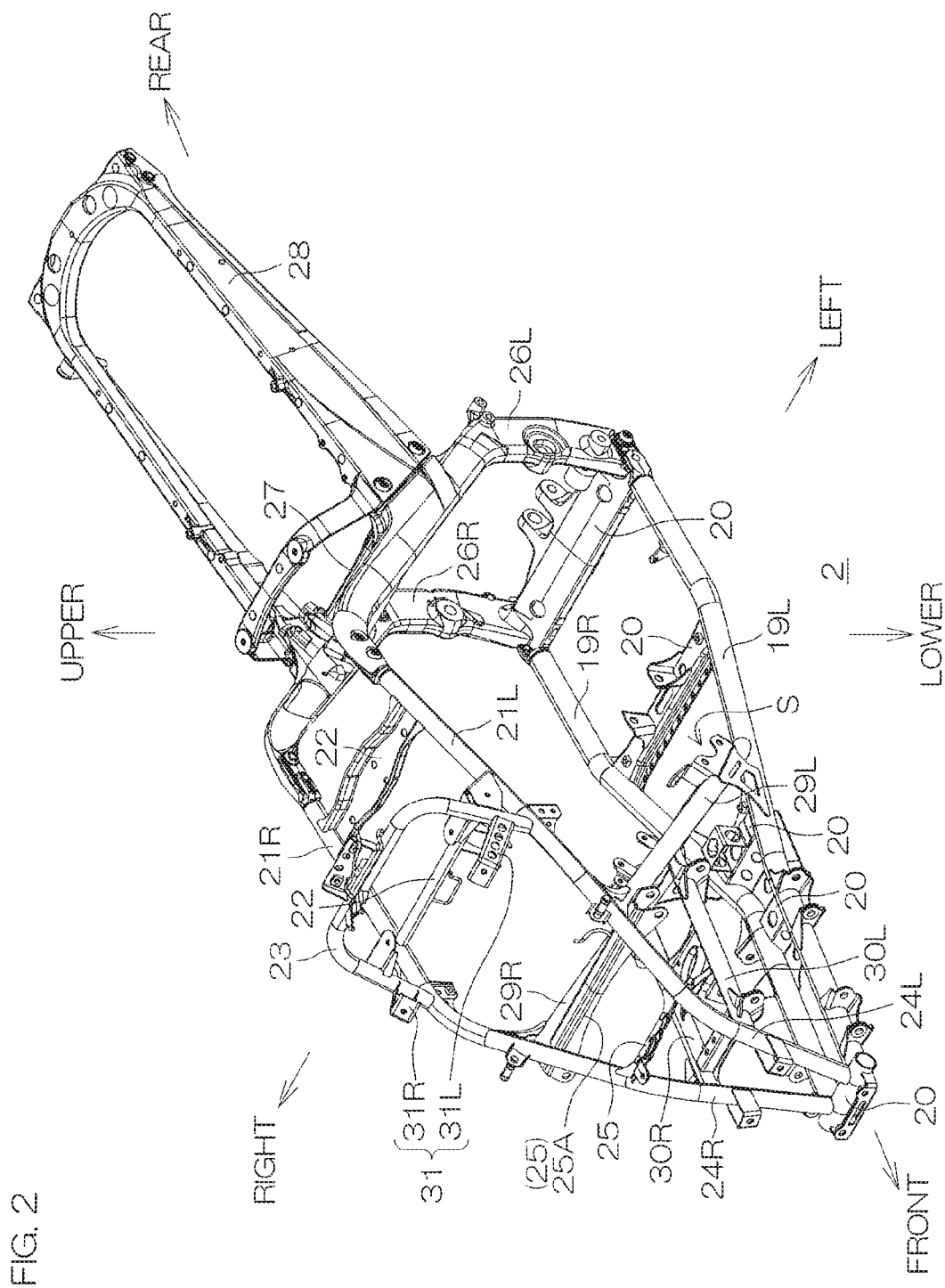
FIG. 2 is a perspective view of a vehicle body frame provided in the straddled vehicle.

FIG. 2 is a perspective view of the vehicle body frame 2. The vehicle body frame 2 defines a vehicle body of the vehicle 1. The vehicle body frame 2 includes a left lower frame 19L, a right lower frame 19R, lower cross members 20, a left upper frame 21L, a right upper frame 21R, upper cross members 22, and a support frame 23. The vehicle body frame 2 includes a left front frame 24L, a right front frame 24R, front cross members 25, a left rear frame 26L, a right rear frame 26R, a rear cross member 27, and a seat rail 28. The vehicle body frame 2 includes a first left cross member 29L, a first right cross member 29R, a second left cross member 30L, and a second right cross member 30R.

The left lower frame 19L and the right lower frame 19R extend in the front-rear direction. The left lower frame 19L and the right lower frame 19R are arranged bilaterally symmetrically, and an interval between these in the left-right direction narrows toward the front. The lower cross members 20 extend in the left-right direction. A plurality of lower cross members 20 respectively join front ends to each other, intermediate portions to each other, and rear ends to each other of the left lower frame 19L and the right lower frame 19R. The left upper frame 21L and the right upper frame 21R are located above the left lower frame 19L and the right lower frame 19R and extend in the front-rear direction. The left upper frame 21L and the right upper frame 21R are arranged bilaterally symmetrically, and an interval between these in the left-right direction widens toward the front. The upper cross member 22 extends in the left-right direction. A single or a plurality of upper cross members 22 join intermediate portions of the left upper frame 21L and the right upper frame 21R to each other.

The support frame 23 preferably has an upside-down U shape, and joins front ends of the left upper frame 21L and the right upper frame 21R to each other. In the support frame 23, at a pair of left and right roof portions respectively joined to the left upper frame 21L and the right upper frame 21R, stays 31 extending toward the front upper side are provided. A pair of left and right stays 31 are included. Front end portions of these stays 31 are bent in directions approaching each other.

The left front frame 24L extends forward and downward from a front end of the left upper frame 21L, and is joined to a front end of the left lower frame 19L. The right front frame 24R extends forward and downward from a front end of the right upper frame 21R, and is joined to a front end of the right lower frame 19R. The left front frame 24L and the right front frame 24R are arranged bilaterally symmetrically, and an interval between these in the left-right direction narrows toward the front. The front cross member 25 extends in the left-right direction. A single or a plurality of front cross members 25 join intermediate portions of the left front frame 24L and the right front frame 24R to each other.

The left rear frame 26L extends rearward and downward from the rear end of the left upper frame 21L, and is joined to the rear end of the left lower frame 19L. The right rear frame 26R extends rearward and downward from the rear end of the right upper frame 21R, and is joined to the rear end of the right lower frame 19R. The left rear frame 26L and the right rear frame 26R are arranged bilaterally symmetrically. The rear cross member 27 extends in the left-right direction. A single or a plurality of rear cross members 27 join intermediate portions of the left rear frame 26L and the right rear frame 26R to each other. The seat rail 28 preferably has a U-shape in a planar view, and is connected to the intermediate portions of the left rear frame 26L and the right rear frame 26R and extends rearward.

The first left cross member 29L extends rearward and downward from an intermediate portion of the left front frame 24L, and is joined to an intermediate portion of the left lower frame 19L. The first right cross member 29R extends rearward and downward from an intermediate portion of the right front frame 24R, and is joined to an intermediate portion of the right lower frame 19R. The first left cross member 29L and the first right cross member 29R are arranged bilaterally symmetrically. The second left cross member 30L extends in the front-rear direction, and is located above a front portion of the left lower frame 19L, and joins intermediate portions of the left front frame 24L and the first left cross member 29L to each other. The second right cross member 30R extends in the front-rear direction, and is located above a front portion of the right lower frame 19R, and joins intermediate portions of the right front frame 24R and the first right cross member 29R to each other.

Figure 3:
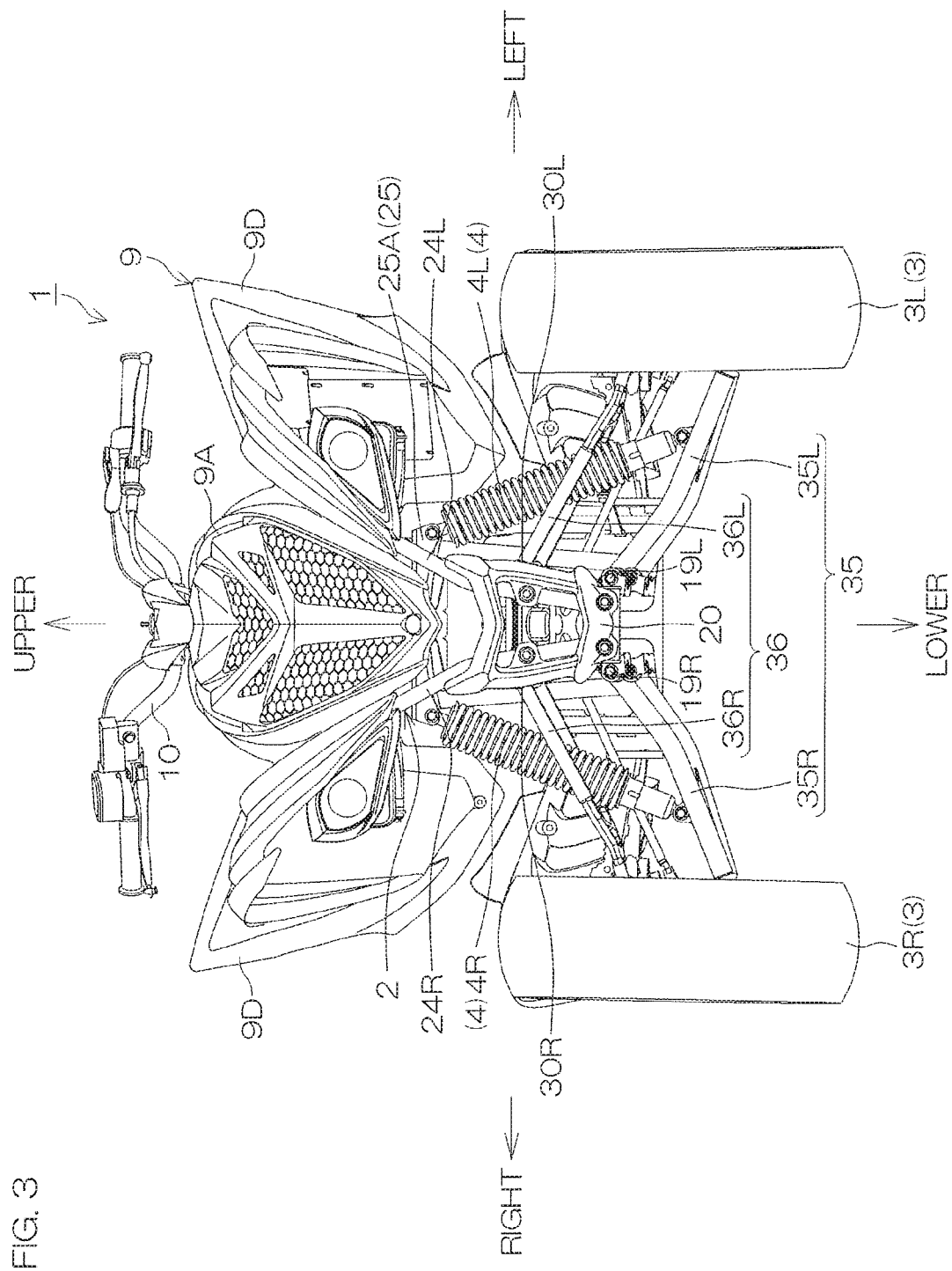
FIG. 3 is a front view of the straddled vehicle.

FIG. 3 is a front view of the vehicle 1. The vehicle 1 includes a pair of left and right lower arms 35 and a pair of left and right upper arms 36. A left lower arm 35L is joined to a front portion of the left lower frame 19L and extends leftward. A left upper arm 36L is located higher than the lower arm 35L, and is joined to the second left cross member 30L and extends leftward. The lower arm 35L and the upper arm 36L are swingable up and down around their right ends, respectively. A right lower arm 35R is joined to a front portion of the right lower frame 19R and extends rightward. A right upper arm 36R is located higher than the lower arm 35R, and is joined to the second right cross member 30R and extends rightward. The lower arm 35R and the upper arm 36R are swingable up and down around their left ends, respectively.

The front wheels 3 include tires. Block-patterned irregularities for traveling on irregular grounds may be provided on the surfaces of the tires. The same applies to the rear wheels 6. The pair of left and right front wheels 3 are located so as to sandwich a front portion of the vehicle body frame 2. The left front wheel 3L is joined to respective left ends of the lower arm 35L and upper arm 36L through knuckle arms (not shown). The right front wheel 3R is joined to respective right ends of the lower arm 35R and the upper arm 36R through other knuckle arms (not shown). Accordingly, the pair of left and right front wheels 3 are supported movably up and down by the front portion of the vehicle body frame 2 through the pairs of left and right lower arms 35 and upper arms 36.

A lower end of the left front shock absorber 4L is joined to the lower arm 35L. An upper end of the front shock absorber 4L is joined to a left end of the front cross member 25A (refer to FIG. 2 as well) protruding leftward from the left front frame 24L of the plurality of front cross members 25. A lower end of the right front shock absorber 4R is joined to the lower arm 35R. An upper end of the front shock absorber 4R is joined to a right end of the front cross member 25A protruding rightward from the right front frame 24R. Referring to FIG. 1, the first left cross member 29L and the first right cross member 29R are located farther rearward than the front wheels 3 and the front shock absorbers 4 in a side view.

The swing arm 5 is joined to a pivot shaft 37 extending across lower portions of the left rear frames 26L and 26R of the vehicle body frame 2, and extends rearward from the pivot shaft 37. The swing arm 5 is swingable up and down around the pivot shaft 37.

The pair of left and right rear wheels 6 are located so as to sandwich a rear portion of the swing arm 5, and are attached to the rear portion of the swing arm 5. Accordingly, the pair of left and right rear wheels 6 are supported movably up and down by the vehicle body frame 2 through the swing arm 5. The vehicle body frame 2 is located higher than centers P of the front wheels 3 and centers Q of the rear wheels 6.

A lower end of the rear shock absorber 7 is joined to the swing arm 5. An upper end of the rear shock absorber 7 is joined to the rear cross member 27 (refer to FIG. 2) of the vehicle body frame 2.

The seat 8 is elongated in the front-rear direction, and is located at a center of the straddled vehicle 1 in the vehicle width direction, and fixed to the seat rail 28 of the vehicle body frame 2. An occupant sits on the seat 8. An upper surface of the seat 8 is a seat surface 8A, and gently lowers rearward.

The exterior component 9 is made of, for example, a resin, and is attached to the vehicle body frame 2. The exterior component 9 includes a front cover 9A, a top cover 9B, and a pair of left and right side covers 9C. The front cover 9A covers at least portions of rear portions of the left front frame 24L and the right front frame 24R from above. The front cover 9A includes a pair of left and right fenders 9D that overhang laterally outward. The fenders 9D are located at the rear side and upper side of the corresponding front wheels 3 in the left-right direction, and extend rearward and bend downward. The top cover 9B is located at the front side of the seat 8, and covers at least portions of the left upper frame 21L and the right upper frame 21R from above. The side covers 9C extend rearward from upper portions of corresponding fenders 9D in the left-right direction to the seat rail 28. The left side cover 9C covers at least portions of the left upper frame 21L and the left rear frame 26L from the left side. The right side cover 9C covers at least portions of the right upper frame 21R and the right rear frame 26R from the right side.

The steering bar 10 is located above the top cover 9B. The steering bar 10 is supported turnably by the support frame 23 (refer to FIG. 2) of the vehicle body frame 2. The vehicle body frame 2 is steered with the front wheels 3 by an occupant seated on the seat 8.

The engine 11 is an internal combustion engine including a crankshaft 38 that rotates around a crank axis C extending in the left-right direction. The crankshaft 38 is incorporated into a lower portion of the engine 11. The engine 11 is placed on the left lower frame 19L and the right lower frame 19R of the vehicle body frame 2 and fixed to these lower frames. The engine 11 is located lower than the seat surface 8A of the seat 8. The swing arm 5 is located farther rearward than the engine 11. Rotation of the crankshaft 38 is transmitted to the rear wheels 6 through, for example, chains (not shown).

Figure 4:
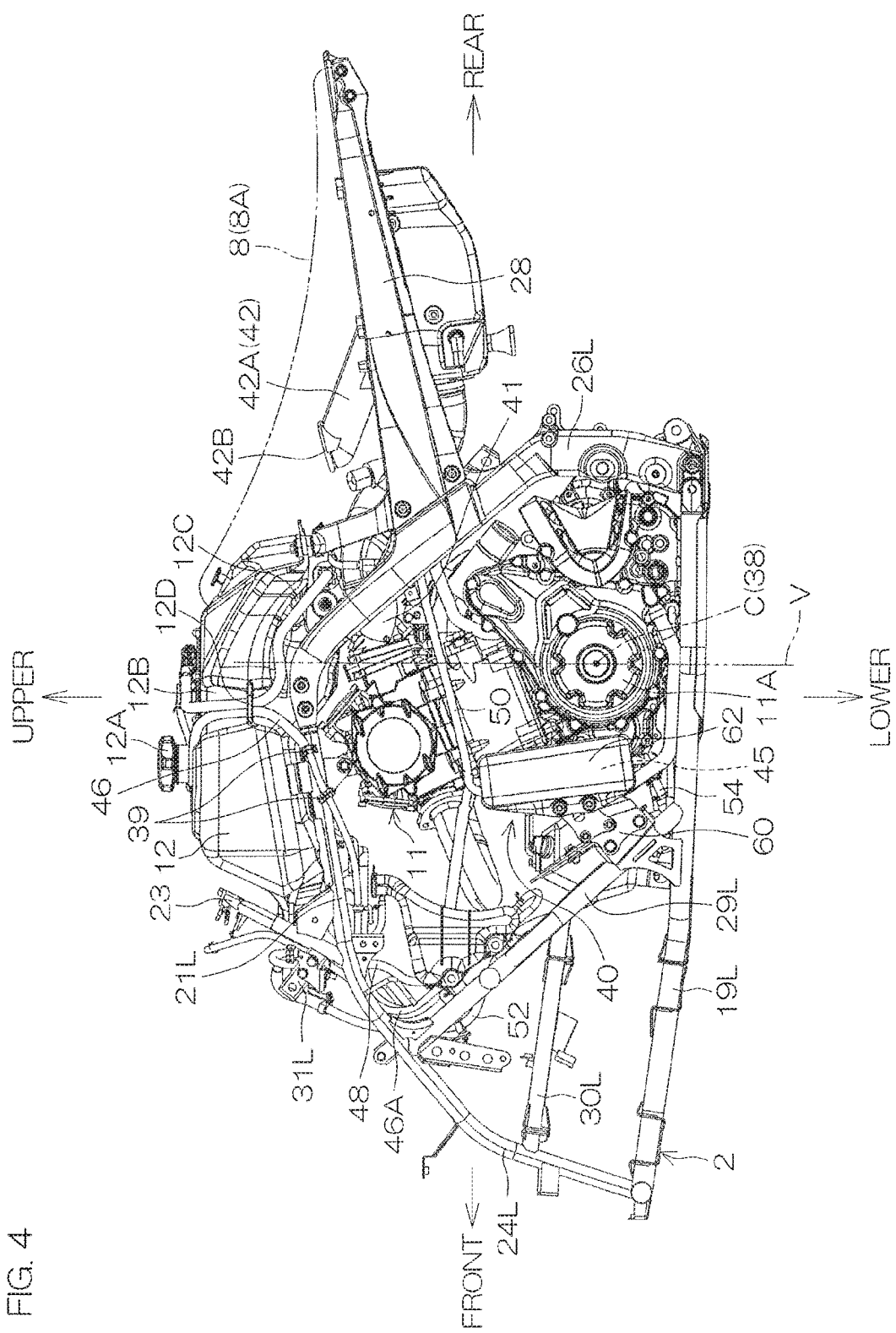
FIG. 4 is a left side view of the vicinity of the vehicle body frame.

FIG. 4 is a left side view of the vicinity of the vehicle body frame 2. The fuel tank 12 stores a fuel for the engine 11. The fuel for the engine 11 is, for example, gasoline. The fuel tank 12 is placed on the upper cross members 22 (refer to FIG. 2) of the vehicle body frame 2 and fixed to at least any of the upper cross members 22, the left upper frame 21L, and the right upper frame 21R. The fuel tank 12 is located farther forward than the seat 8 and higher than the engine 11. The fuel tank 12 is covered by the top cover 9B from above, and covered by the pair of left and right side covers 9C from the lateral outer sides (refer to FIG. 1). On an upper surface of the fuel tank 12, an oil filler port (not shown) and a fuel cap 12A that opens and closes the oil filler port are provided. The fuel cap 12A is not covered by the top cover 9B, but is exposed higher than the top cover 9B. On a left surface of the fuel tank 12, a vertical recess 12B extending in the up-down direction, and a transverse recess 12C extending rearward from a lower end of the vertical recess 12B, are provided.

Figure 5:
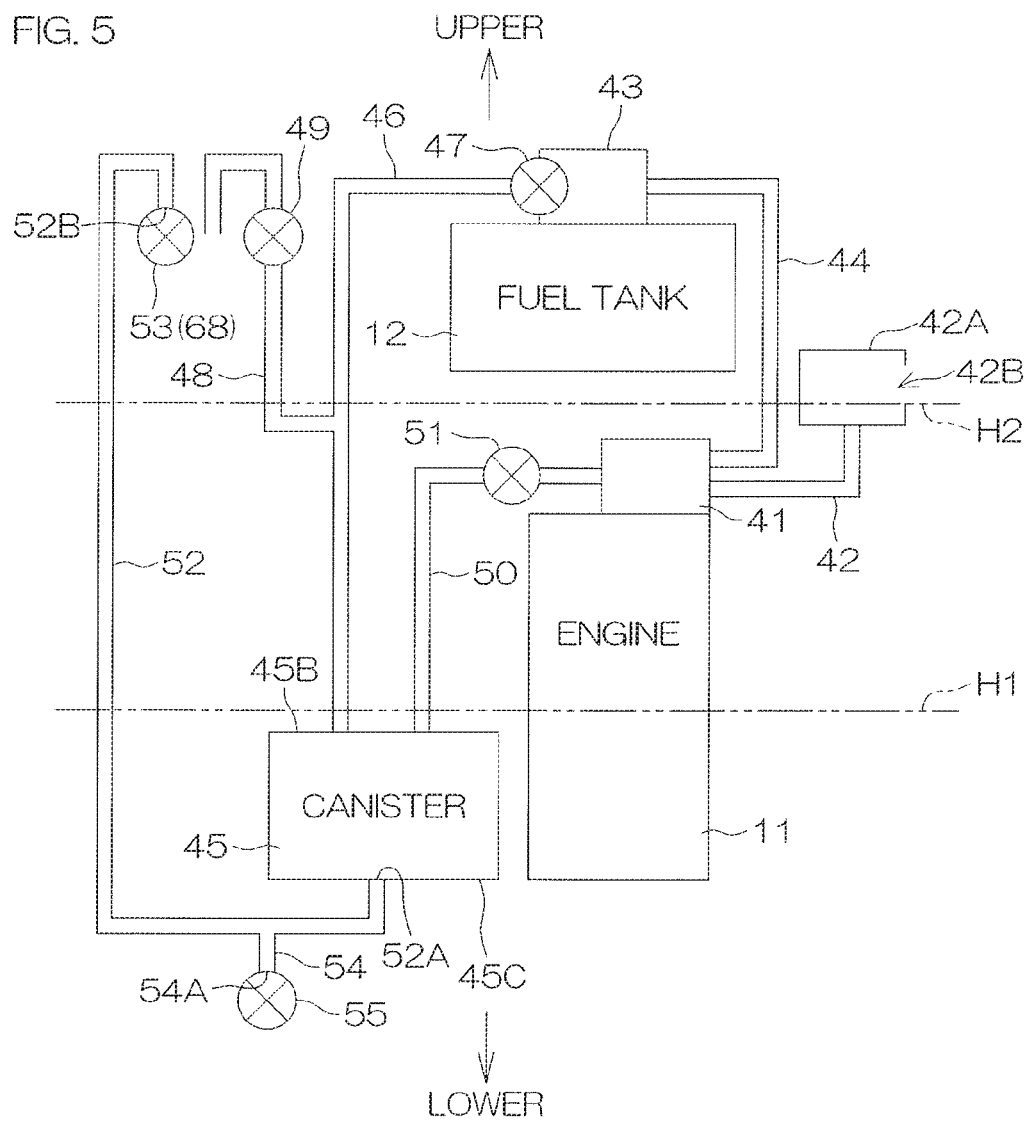
FIG. 5 is a schematic view to describe a fuel system of the straddled vehicle.

FIG. 5 is a schematic view to describe a fuel system 40 in the vehicle 1. Various pipes described below are, for example, flexible rubber hoses, however, without being limited to rubber, the pipes may be made of metal. To prevent the occurrence of liquid pooling, the pipes do not include U-shaped portions that extend upward. Intermediate portions of the respective pipes are fixed to the vehicle body frame 2 by positioners 39 (refer to FIG. 4), such as bands, so as not to move. The fuel system 40 includes a throttle body 41, an intake passage 42, a fuel pump 43, a fuel pipe 44, a canister 45, a gas pipe 46, a shut-off valve 47, a relief pipe 48, and a relief valve 49. The fuel system 40 includes a purge pipe 50, a purge cut valve 51, a breather pipe 52, an intake valve 53, a drain pipe 54, and a backflow valve 55. The fuel tank 12 may be an element of the fuel system 40.

The throttle body 41 is connected to an intake port (not shown) of the engine 11. The throttle body 41 is located higher than a first horizontal line H1 passing through higher ones of the upper ends of the front wheels 3 and the upper ends of the rear wheels 6. The intake passage 42 is connected to the throttle body 41, and extends upward from the throttle body 41. An intake box 42A is provided at an upper end portion of the intake passage 42. An air inlet 42B that takes air into the intake box 42A is provided in the intake box 42A (refer to FIG. 4 as well). A second horizontal line H2 passing through a lower end of the air inlet 42B is located higher than the first horizontal line H1. Air around the intake box 42A is taken into the intake box 42A from the air inlet 42B. Air taken into the intake box 42A is purified by passing through a filter (not shown) inside the intake box 42A. The purified air continuously flows inside the intake passage 42, and is supplied to the intake port of the engine 11 through the throttle body 41.

Figure 6:
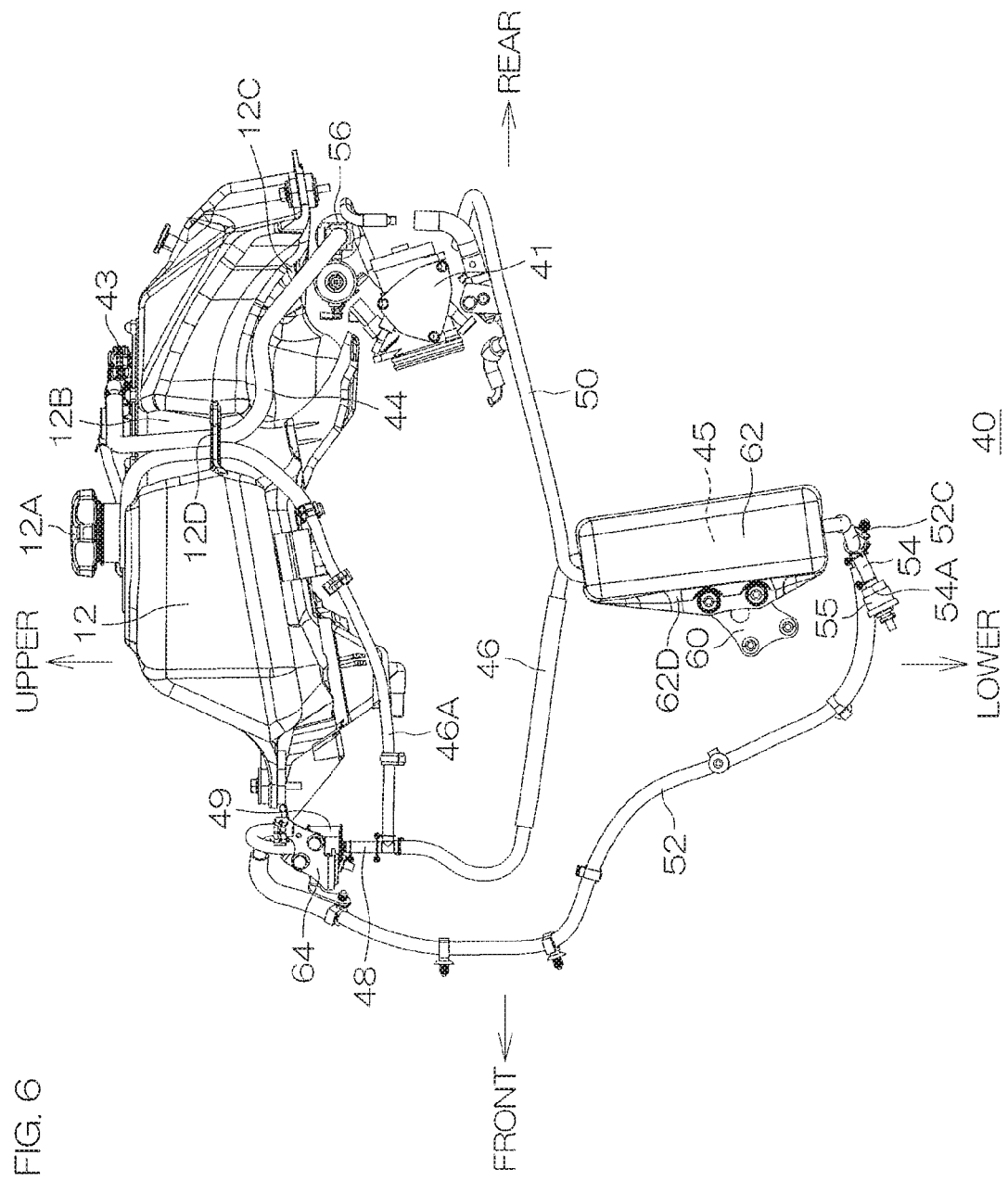
FIG. 6 is a left side view of the fuel system.

FIG. 6 is a left side view of the fuel system 40. The fuel pump 43 is incorporated in the fuel tank 12. An upper end of the fuel pump 43 is exposed to the upper surface of the fuel tank 12, and is located, for example, farther rearward than the fuel cap 12A.

One end of the fuel pipe 44 is connected to the fuel tank 12 through the fuel pump 43. The fuel pipe 44 extends leftward from the fuel pump 43, extends downward through the vertical recess 12B of the fuel tank 12, and extends rearward through the transverse recess 12C of the fuel tank 12. In the fuel pipe 44, the other end protruding from the transverse recess 12C is connected to an injector 56 provided in the throttle body 41.

Fuel inside the fuel tank 12 is pumped out by the fuel pump 43 and fed into the fuel pipe 44. The fuel that flows inside the fuel pipe 44 is then injected to the intake port (not shown) of the engine 11 by an injector 56. The fuel injected into the intake port and air that has flowed inside the intake passage 42 and arrived at the intake port are mixed to become an intake gas, and ignited and combusted inside the cylinder of the engine 11. Accordingly, power to rotate the crankshaft 38 is generated in the engine 11.

Figure 7:
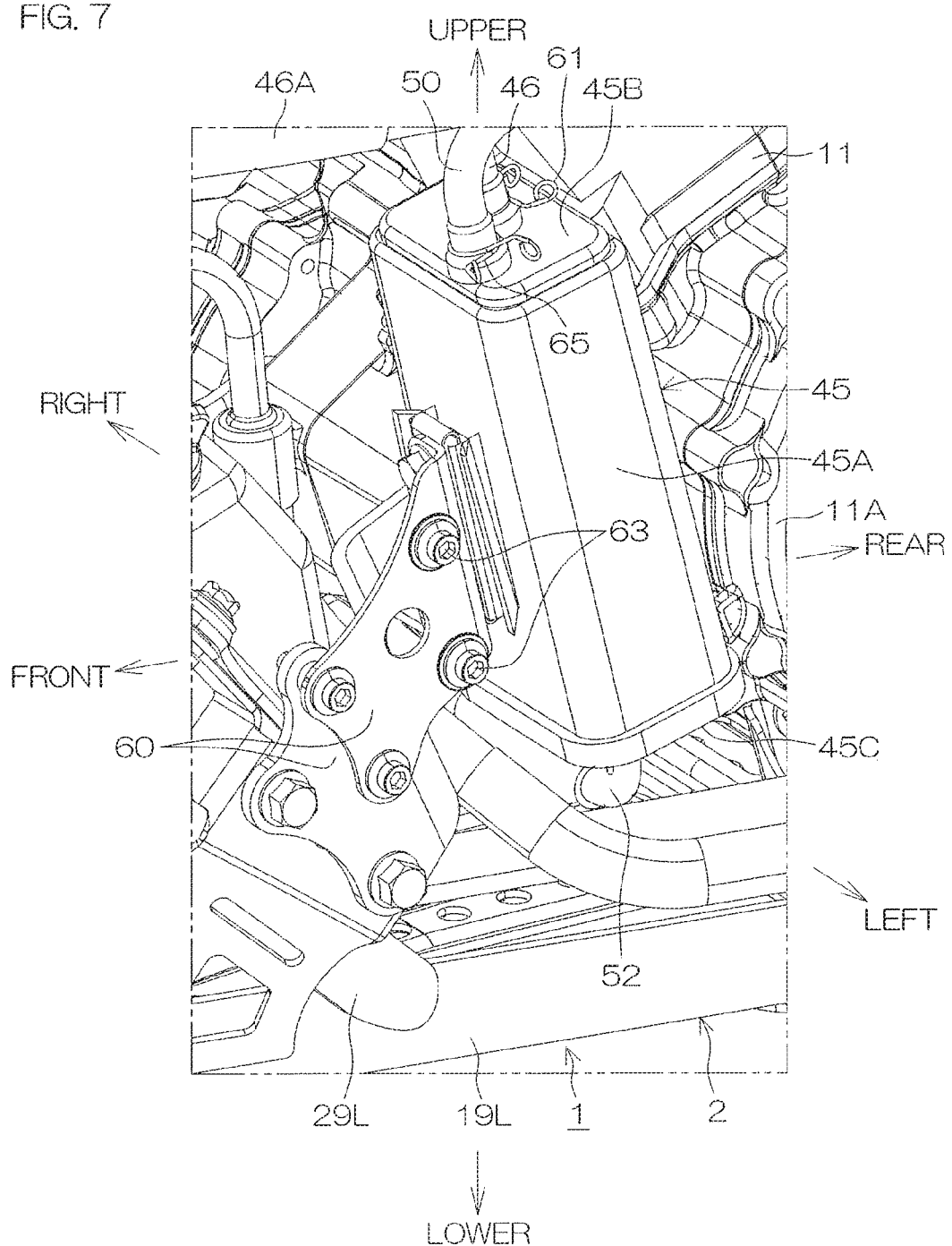
FIG. 7 is a perspective view of the vicinity of a canister in the fuel system, viewed from the left front side.

FIG. 7 is a perspective view of the vicinity of the canister 45, viewed from the left front side. The canister 45 is preferably a substantially box-shaped waterproof case containing an adsorbent (not shown) such as activated carbon. The canister 45 in the present preferred embodiment has a substantially rectangular parallelepiped shape that is vertically elongated, and is located, while slightly inclining with respect to the vertical direction, so that an upper end deviates farther to the front than a lower end thereof. An outer surface of the canister 45 includes a vertical surface 45A having a quadrangular cylindrical shape, a quadrangular upper surface 45B connected to an upper end edge of the vertical surface 45A, and a quadrangular lower surface 45C connected to a lower end edge of the vertical surface 45A. An upper end portion of the vertical surface 45A and the upper surface 45B define an upper portion of the outer surface of the canister 45. A lower end portion of the vertical surface 45A and the lower surface 45C define a lower portion of the outer surface of the canister 45.

The inside of the canister 45 is hermetically sealed. Therefore, the canister 45 may be located at a position where it may get wet. The canister 45 in the present preferred embodiment is located in an inconspicuous position near an area beneath the feet of an occupant seated on the seat 8. More specifically, the canister 45 is located farther forward than a virtual vertical plane V passing through the crank axis C of the engine 11 and extending in the left-right direction, and lower than the fuel tank 12 and the throttle body 41 (refer to FIG. 1). The canister 45 is located farther to the left than a center (not shown) of the engine 11 in the left-right direction. The canister 45 is located in front of a discoid-shaped crank cover 11A that projects leftward in the engine 11 and covers the left end of the crankshaft 38. The canister 45 faces a portion farther to the front than the crank cover 11A on the left surface of the engine 11 from the left side. The lower portion of the canister 45 is at the same or substantially the same height position as the crank axis C. In a side view, the canister 45 is located farther rearward than the first left cross member 29L in the vehicle body frame 2 and higher than the left lower frame 19L. The canister 45 is fixed to the first left cross member 29L through a bracket 60. The bracket 60 may include a single component or a plurality of combined components. The bracket 60 may be an element of the canister 45.

One end of the gas pipe 46 is connected to the fuel tank 12 through the fuel pump 43 (refer to FIG. 5). Inside the fuel pump 43, an internal flow path (not shown) that feeds the fuel from the fuel tank 12 into the fuel pipe 44 is provided separately from the one end of the gas pipe 46. As shown in FIG. 6, the gas pipe 46 extends leftward from the fuel pump 43, and passes through the vertical recess 12B of the fuel tank 12 and then extends downward. The gas pipe 46 inside the vertical recess 12B is located in front of the fuel pipe 44. On the fuel tank 12, a positioner 12D is provided to cross the vertical recess 12B in the front-rear direction. The positioner 12D positions the fuel pipe 44 and the gas pipe 46 inside the vertical recess 12B so as to prevent these elements from moving leftward.

In the gas pipe 46, a portion protruding downward from the vertical recess 12B includes a U-turn portion 46A extending toward the lower front side and then bends toward the lower rear side. In the U-turn portion 46A, a rear end of a portion bent toward the lower rear side defines the other end of the gas pipe 46. The other end of the gas pipe 46 is bent downward and connected to the upper portion of the outer surface of the canister 45, specifically, to the upper surface 45B (refer to FIG. 7). A tubular first joint (not shown) projecting upward is provided on the upper surface 45B. The first joint is inserted in the other end of the gas pipe 46. The other end of the gas pipe 46 in this state is connected to the canister 45 so as not to come off the first joint by being clipped by a clip 61 (refer to FIG. 7). As the clip 61, a publicly known hose band or the like is able to be used.

The canister 45 is connected to the fuel tank 12 though the gas pipe 46. Vaporized gas generated by evaporation of the fuel inside the fuel tank 12 passes through the gas pipe 46 and flows into the canister 45, and is adsorbed by the adsorbent (not shown) inside the canister 45.

Figure 8:
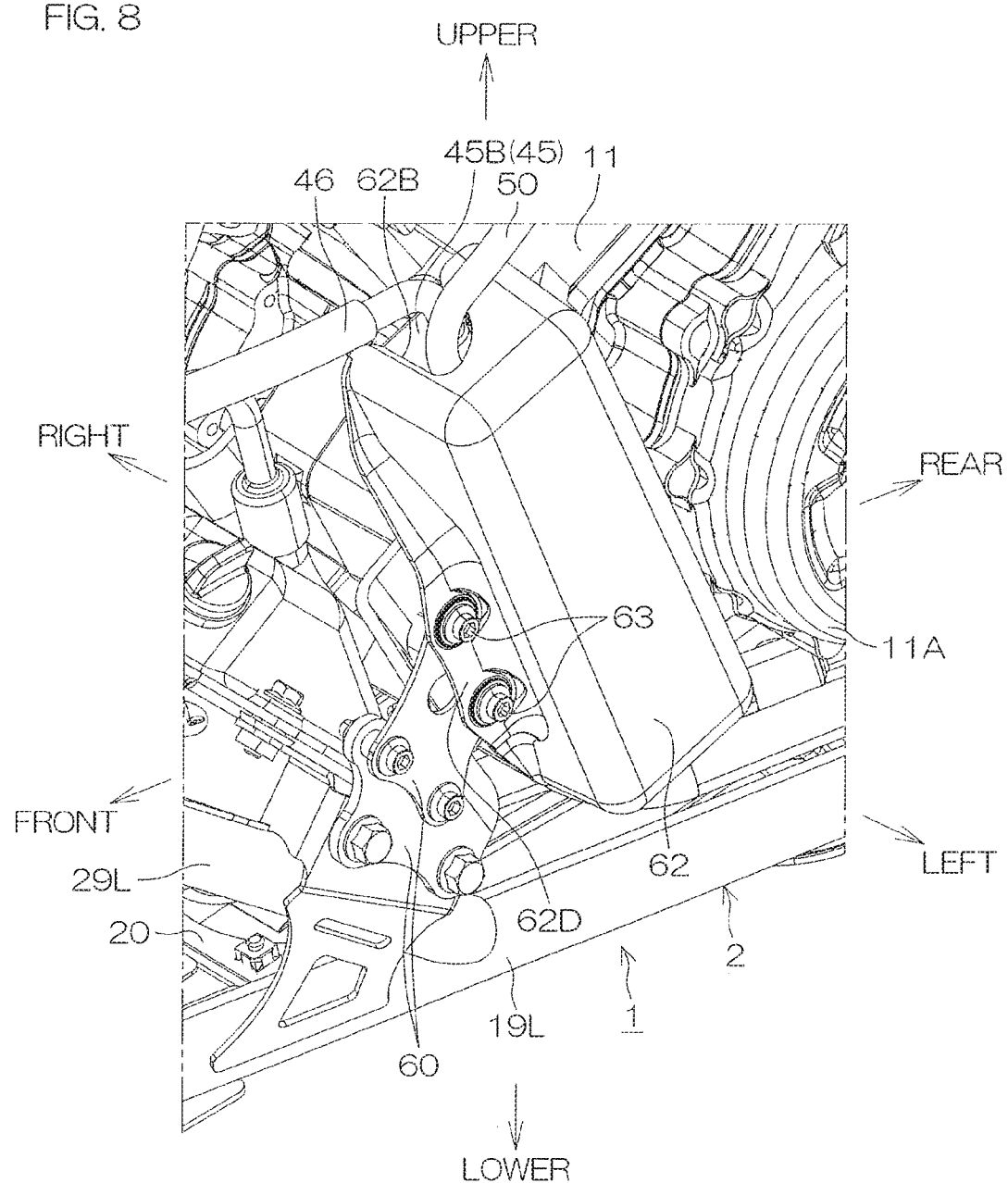
FIG. 8 is a perspective view of the vicinity of a cover that covers the canister, viewed from the left front side.
Figure 9:
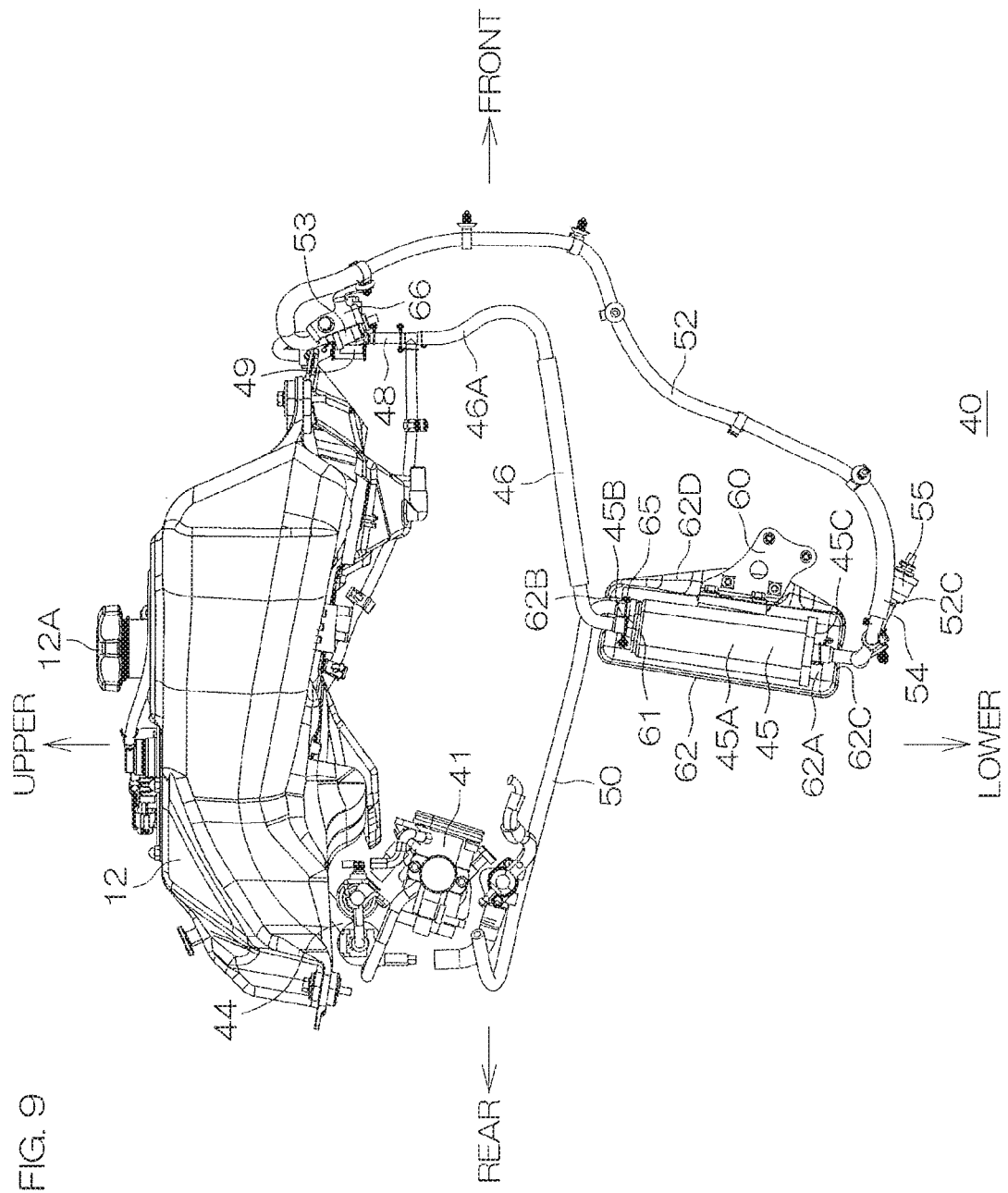
FIG. 9 is a right side view of the fuel system.

In relation to the canister 45, the vehicle 1 includes a cover 62 shown in FIG. 8. The cover 62 preferably has a box shape slightly larger than the canister 45. On a right surface of the cover 62, a vertically elongated opening 62A is provided that opens the internal space of the cover 62 rightward (refer to FIG. 9). In a top wall of the cover 62, an upper notch 62B recessed leftward continuously from an upper end of the opening 62A is provided. In a bottom wall of the cover 62, a lower notch 62C recessed leftward continuously from a lower end of the opening 62A is provided (refer to FIG. 9).

On the cover 62, a flange 62D that overhangs forward from a right edge of a front wall of the cover 62 is provided. The flange 62D is assembled to the bracket 60 by fastening members 63, such as bolts. Accordingly, similarly to the canister 45, the cover 62 is fixed to the first left cross member 29L through the bracket 60.

The canister 45 is housed inside the cover 62. The cover 62 in this state is located so as to sandwich the canister 45 with the engine 11, and covers at least a portion (the entire in the present preferred embodiment) of the canister 45 from the left side, which is an example of a lateral outer side of the vehicle 1. The cover 62 covers the canister 45 from the front side, the rear side, the upper side, and the lower side as well. The gas pipe 46 connected to the upper surface 45B of the canister 45 passes through the upper notch 62B of the cover 62 and extends outward to the outside of the cover 62. The clip 61 that connects the gas pipe 46 to the canister 45 is located at the right side, which is an example of a lateral inner side of the vehicle 1 with respect to the cover 62 (refer to FIG. 9).

The shut-off valve 47 is integral with the fuel pump 43, and is connected to one end of the gas pipe 46 (refer to FIG. 5). The shut-off valve 47 is located higher than each of the fuel tank 12, the canister 45, and the seat surface 8A of the seat 8 (refer to FIG. 1). The shut-off valve 47 includes a disc (not shown). The vehicle 1 traveling on a rough road may tilt with respect to the vertical direction. When a tilt angle of the vehicle 1 with respect to the vertical direction is less than a predetermined angle (for example, about 45 degrees), the disc of the shut-off valve 47 is at an open position where the disc does not shut off the gas pipe 46. However, when the vehicle 1 tilts at the predetermined angle or more with respect to the vertical direction, the disc of the shut-off valve 47 is displaced from the open position to a closed position and shuts off the gas pipe 46. Accordingly, the fuel inside the fuel tank 12 is prevented from passing through the gas pipe 46 and flowing into the canister 45 while the fuel is in a liquid state.

Figure 10:
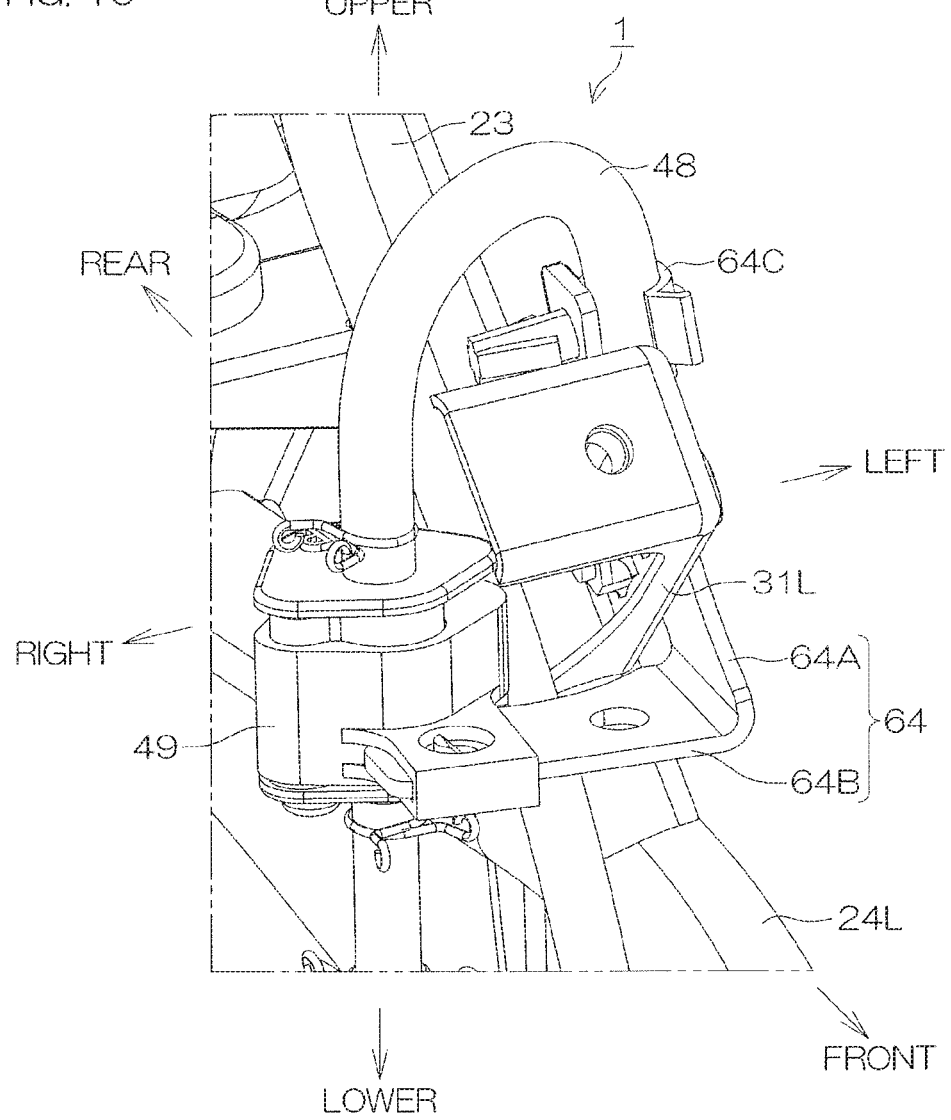
FIG. 10 is a perspective view of the vicinity of a relief pipe in the fuel system.
Figure 11:
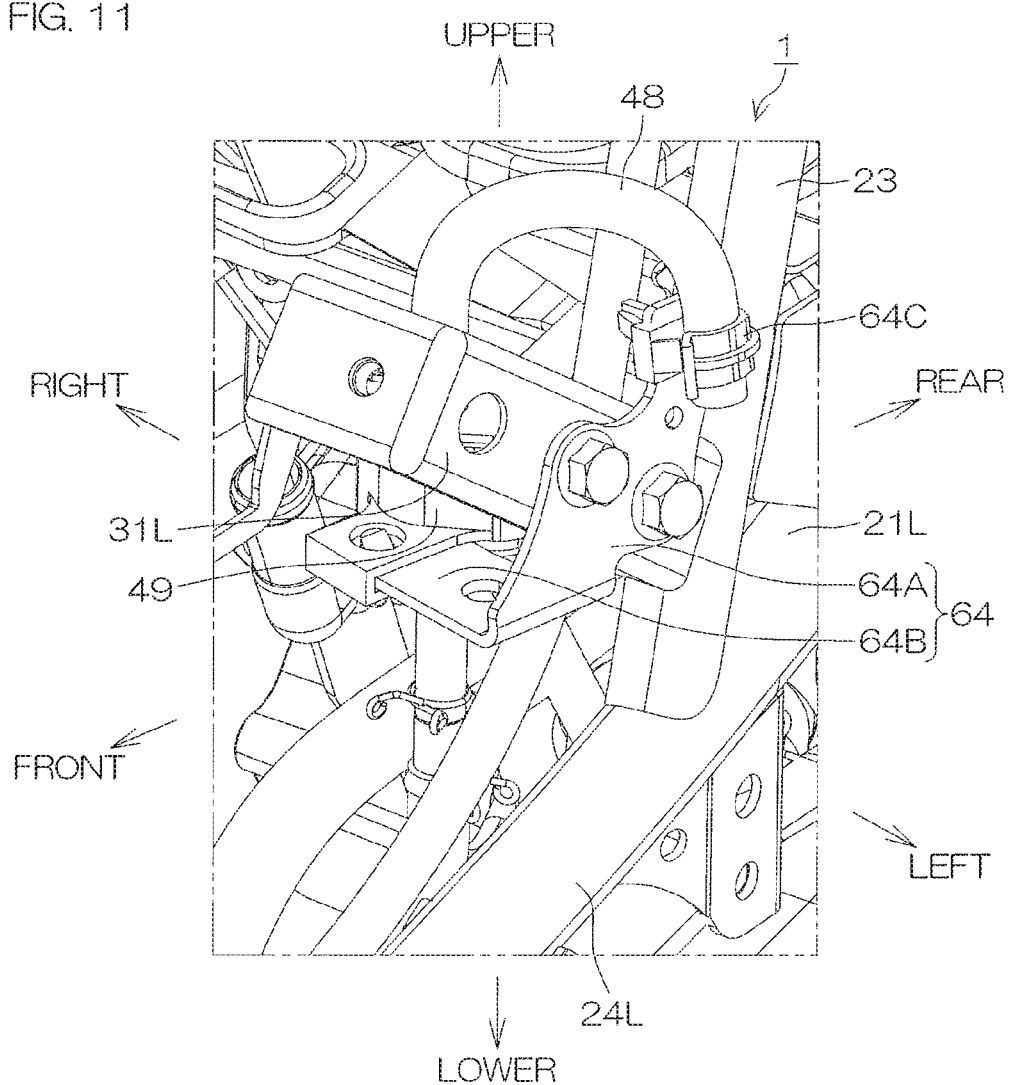
FIG. 11 is a perspective view of the vicinity of the relief pipe, viewed from a direction different from that in FIG. 10.

One end of the relief pipe 48 is connected to an intermediate portion of the gas pipe 46, specifically, to a portion of the U-turn portion 46A extending toward the lower front side (refer to FIG. 6). The relief pipe 48 extends upward from an intermediate portion of the gas pipe 46. FIG. 10 and FIG. 11 are perspective views of the vicinity of the other end of the relief pipe 48. The other end of the relief pipe 48 preferably has an inverted U-shape, and extends upward, then bends leftward, and then extends downward, and opens downward. The relief valve 49 is connected to the portion extending upward at the other end of the relief pipe 48.

The other end of the relief pipe 48 and the relief valve 49 are located higher than the second horizontal line H2, and are fixed to a left stay 31L in the vehicle body frame 2 through a common bracket 64. The bracket 64 includes a vertical plate portion 64A extending in the up-down direction, and a lateral plate portion 64B extending rightward from a lower end of the vertical plate portion 64A. A portion extending downward at the other end of the relief pipe 48 is sandwiched by a substantially C-shaped positioner 64C provided at an upper end portion of a right surface of the vertical plate portion 64A. The relief valve 49 is attached to a right end of the lateral plate portion 64B.

When the pressure inside the fuel tank 12 becomes negative in response to cooling of the fuel tank 12, etc., the relief valve 49 opens. Accordingly, the inside of the fuel tank 12 is opened to the atmosphere through the gas pipe 46 and the relief pipe 48, so that the negative pressure state inside the fuel tank 12 is eliminated. When the negative pressure state inside the fuel tank 12 is eliminated, the relief valve 49 closes. When the pressure inside the fuel tank 12 becomes negative in a state in which the gas pipe 46 is clogged with foreign matter, the fuel tank 12 may deform and shrink. However, since the relief valve 49 opens, the negative pressure state inside the fuel tank 12 is eliminated, and therefore, deformation of the fuel tank 12 is avoided.

One end of the purge pipe 50 is connected to the upper portion of the outer surface of the canister 45, specifically, to a portion that avoids the gas pipe 46 on the upper surface 45B of the canister 45 (refer to FIG. 7). The purge pipe 50 passes through the upper notch 62B of the cover 62 covering the canister 45 and extends outward to the outside of the cover 62 (refer to FIG. 8). On the upper surface 45B, a tubular second joint (not shown) projecting upward is provided. The second joint is inserted in the one end of the purge pipe 50. The one end of the purge pipe 50 in this state is connected to the canister 45 so as not to come off the second joint by being clipped by a clip 65 (refer to FIG. 7), similar to the above-described clip 61.

The other end of the purge pipe 50 is connected to the throttle body 41 (refer to FIG. 5). Therefore, the purge pipe 50 connects the throttle body 41 and the canister 45. The purge cut valve 51 is located higher than the canister 45 and the first horizontal line H1 and lower than the air inlet 42B of the intake box 42A, and is connected to an intermediate portion of the purge pipe 50 (refer to FIG. 5). The purge cut valve 51 may be a solenoid valve, for example, that is controlled to open and close the purge pipe 50.

Figure 12:
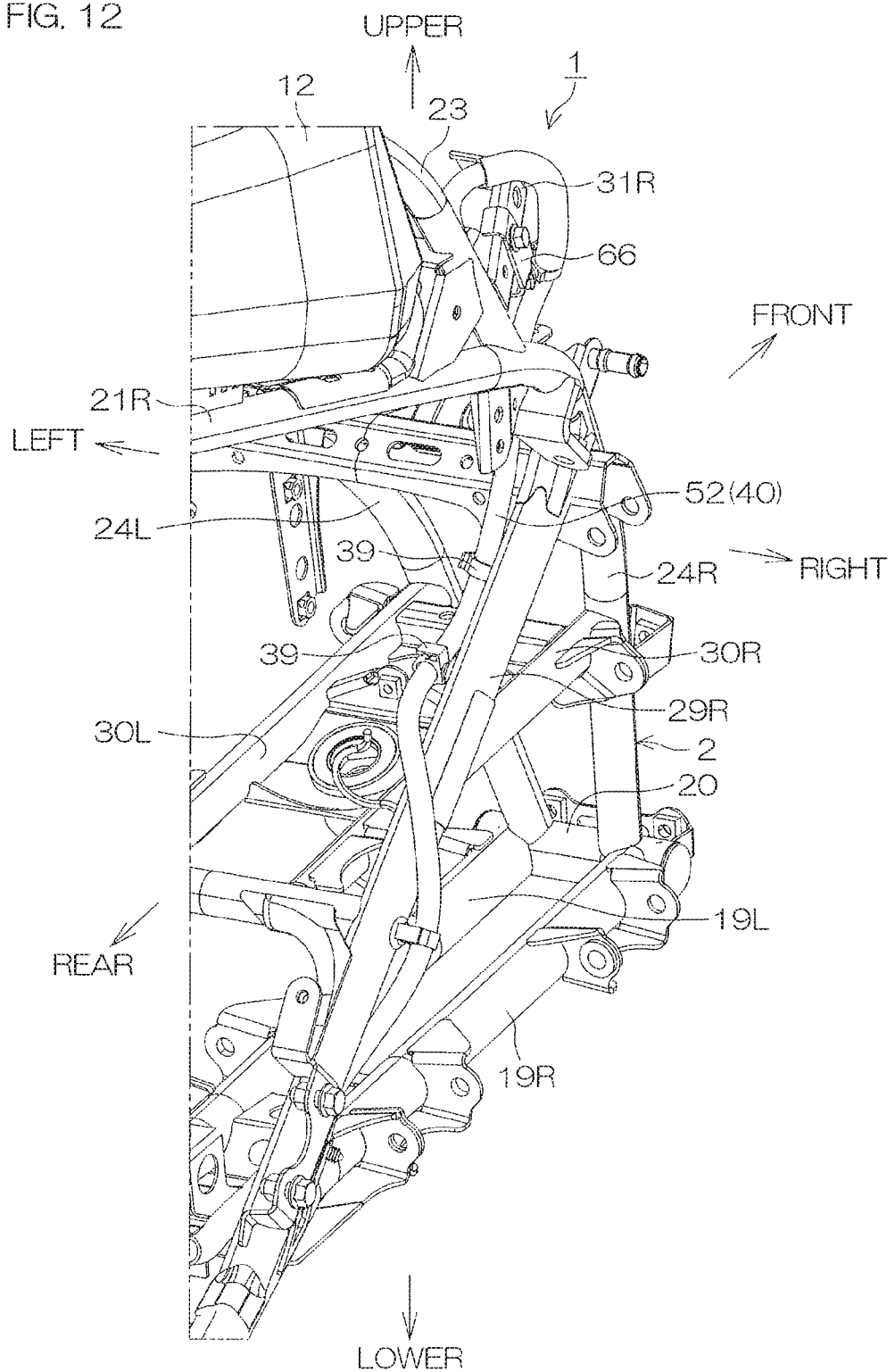
FIG. 12 is a perspective view of an essential portion of the vehicle body frame and the fuel system.
Figure 13:
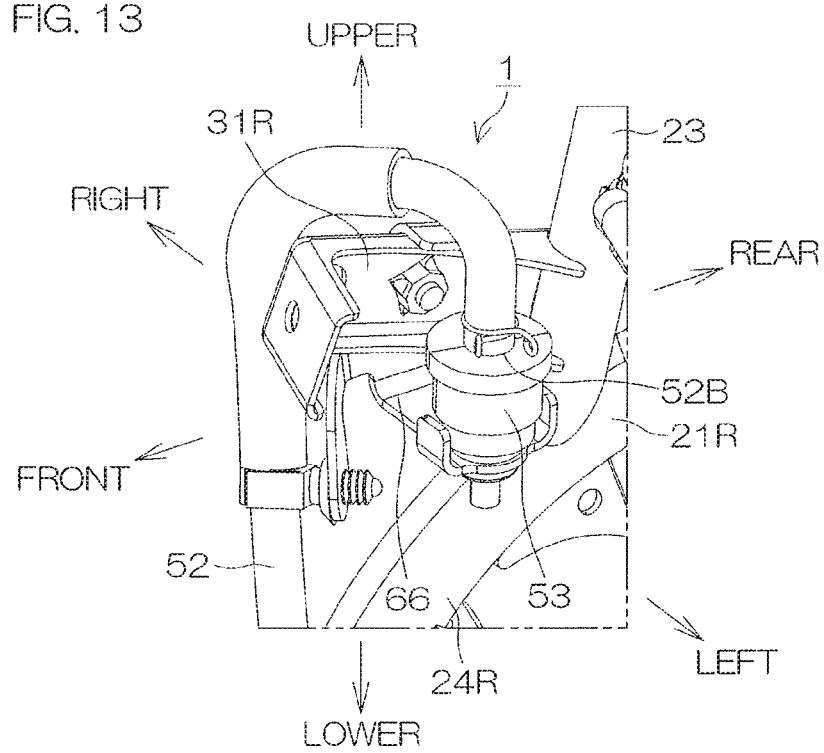
FIG. 13 is a perspective view of the vicinity of a breather pipe in the fuel system.

The breather pipe 52 includes an inlet 52A positioned at one end of the breather pipe 52, and an outlet 52B positioned at the other end of the breather pipe 52 (refer to FIG. 5). The inlet 52A is connected to the lower portion of the canister 45, specifically, to the lower surface 45C of the canister 45. FIG. 12 is a perspective view of an essential portion of the vehicle body frame 2 and the fuel system 40, viewed from the right side. The breather pipe 52 extends downward from the inlet 52A and then bends and extends rightward, and extends toward the front upper side along the first right cross member 29R of the vehicle body frame 2. FIG. 13 is a perspective view of the vicinity of the other end of the breather pipe 52. The other end of the breather pipe 52 preferably has an inverted U-shape, and extends upward and is then bent leftward, and crosses over a right stay 31R in the vehicle body frame 2 and then extends downward. The other end of the breather pipe 52 is covered by the front cover 9A (refer to FIG. 1) of the exterior component 9 from at least the front side and the upper side. At a lower end of a portion extending downward at the other end of the breather pipe 52, the outlet 52B is provided. The outlet 52B is located at the same or substantially the same height position as the air inlet 42B of the intake box 42A, or higher than such a height position (refer to FIG. 5). Therefore, the outlet 52B is located higher than the upper surface 45B of the canister 45. Air such as vaporized gas purified by passing through the adsorbent inside the canister 45 flows through the breather pipe 52 and flows out from the outlet 52B.

Figure 14:
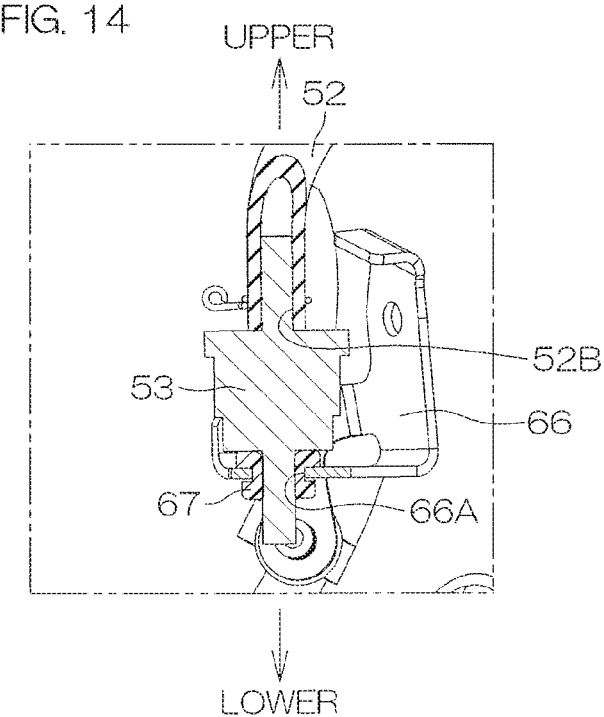
FIG. 14 is a longitudinal sectional view of the vicinity of an intake valve in the fuel system.

The intake valve 53 is located higher than the first horizontal line H1 (refer to FIG. 5), and preferably higher than the second horizontal line H2. An upper end portion of the intake valve 53 is inserted into the outlet 52B of the breather pipe 52. The intake valve 53 is fixed to the stay 31R through a bracket 66. FIG. 14 is a longitudinal sectional view of the intake valve 53. A through hole 66A penetrating vertically through the bracket 66 is provided just below the outlet 52B. A lower end portion of the intake valve 53 is inserted into the through hole 66A and joined to the bracket 66 by a grommet 67. The intake valve 53 is a one-way valve that opens and closes the outlet 52B.

During operation of the engine 11, the pressure inside the throttle body 41 is negative so that when the purge cut valve 51 opens, the pressure inside the purge pipe 50 also becomes negative. Then, air inside the purge pipe 50 and inside the breather pipe 52 is sucked in by the engine 11, and in response to this, the intake valve 53 opens the outlet 52B of the breather pipe 52 to the atmosphere. Accordingly, outside air is sucked in from the breather pipe 52 and supplied to the canister 45. The fuel adsorbed by the canister 45 is released to the outside air and becomes vaporized gas, and passes through the purge pipe 50 and is supplied to the throttle body 41, and purged as an intake gas in the engine 11. In this way, it is possible to effectively utilize the fuel adsorbed by the canister 45 for operation of the engine 11. By discharging the vaporized gas from the inside of the canister 45, the adsorbent (not shown) inside the canister 45 is refreshed.

The drain pipe 54 is located lower than the lower surface 45C of the canister 45 (refer to FIG. 5). The drain pipe 54 branches from an upstream portion 52C that extends downward from the inlet 52A of the breather pipe 52 and then bends rightward, and extends toward the front lower side (refer to FIG. 6). A drain hole 54A is provided at a lower end of the drain pipe 54 (refer to FIG. 5). The drain hole 54A is located lower than the outlet 52B of the breather pipe 52. The drain hole 54A is located so as to face the ground G (refer to FIG. 1) through a space S (refer to FIG. 2) between the left lower frame 19L and the right lower frame 19R of the vehicle body frame 2.

The backflow valve 55 is located at the lowest position in the fuel system 40, and is inserted in the drain hole 54A (refer to FIG. 6). The backflow valve 55 is fixed to the vehicle body frame 2 through a bracket (not shown). The backflow valve 55 is a so-called one-way valve, and makes a liquid inside the drain pipe 54 flow down from the drain hole 54A to the ground G, but prevents a backflow from the drain hole 54A to the inside of the drain pipe 54.

As described above, with the structural arrangement of the present preferred embodiment, the canister 45 is located farther forward than the vertical plane V along the crank axis C, which extends in the left-right direction of the engine 11 and lower than the fuel tank 12, and lower than the fuel tank 12 (refer to FIG. 1). Accordingly, the location space of the canister 45 does not influence the capacity of the fuel tank 12. Therefore, even in the straddled vehicle 1 for sports traveling in which the swing arm 5 makes it difficult to secure the location space of the canister 45 farther rearward than the engine 11, the canister 45 is able to be located without reducing the capacity of the fuel tank 12.

In the present preferred embodiment, the cover 62 is located so as to sandwich the canister 45 with the engine 11, and covers at least a portion of the canister 45 from a lateral outer side of the straddled vehicle 1. Therefore, the cover 62 makes it possible to prevent the feet, etc., of an occupant seated on the seat 8 from touching the canister 45 from the lateral outer side.

In the present preferred embodiment, the clip 61 that connects the gas pipe 46 to the canister 45 is located so as to be concealed in the lateral inner side of the cover 62. This makes it possible to prevent the gas pipe 46 from coming off the canister 45 in response to accidental contact by an occupant, etc., with the clip 61 from the lateral outer side. Similarly, this applies to the clip 65 (refer to FIG. 7) that connects the purge pipe 50 to the canister 45.

In the present preferred embodiment, when the straddled vehicle 1 tilts at a predetermined angle or more with respect to the vertical direction, the shut-off valve 47 makes it possible to prevent liquid fuel inside the fuel tank 12 from flowing into the canister 45 through the gas pipe 46. The shut-off valve 47 is integral with the fuel pump 43. Therefore, a bracket to fix the position of the shut-off valve 47 and a pipe, etc., to connect the shut-off valve 47 and the fuel tank 12 are able to be omitted. The shut-off valve 47 is covered by the top cover 9B of the exterior component 9. This makes it possible to prevent the gas pipe 46 from coming off the shut-off valve 47 in response to accidental contact by an occupant, etc., from the outside.

In the present preferred embodiment, the breather pipe 52 connected to the canister 45 opens to the atmosphere at the outlet 52B. The intake valve 53 prevents foreign matter from entering the inside of the breather pipe 52 from the outlet 52B by closing the outlet 52B. In place of the intake valve 53, an air cleaner 68 may be provided at the outlet 52B (refer to FIG. 5). The air cleaner 68 traps foreign matter such as dust from air flowing inside the breather pipe 52 from the outlet 52B. The intake valve 53 and the air cleaner 68 are located higher than upper ends of the front wheels 3 and the rear wheels 6. This makes it difficult for foreign matter such as dust and water to reach the intake valve 53 and the air cleaner 68 even during off-road traveling of the straddled vehicle 1. As described above, it is possible to prevent foreign matter from entering the canister 45 from the outlet 52B through the inside of the breather pipe 52. Therefore, when the foreign matter is water, it is possible to prevent the performance of the canister 45 from degrading due to wetting, etc., of the adsorbent (not shown) inside the canister 45 when water enters the inside of the canister 45.

In the present preferred embodiment, the air inlet 42B of the intake passage 42 that supplies air to the engine 11 is located higher than a water level assumed when the straddled vehicle 1 is immersed in water. Therefore, the outlet 52B of the breather pipe 52, which is located at a height position equal to or higher than the height position of the air inlet 42B, is also located higher than the assumed water level. This makes it possible to prevent water from entering the inside of the canister 45 through the breather pipe 52 when the straddled vehicle 1 is immersed in water.

In the present preferred embodiment, the outlet 52B of the breather pipe 52 is covered by the exterior component 9, and is not exposed to the outside of the straddled vehicle 1. Therefore, it is difficult for foreign matter outside the straddled vehicle 1 to reach the outlet 52B. This makes it possible to prevent foreign matter from entering the canister 45 from the outlet 52B through the inside of the breather pipe 52. Accordingly, during operation of the engine 11, comparatively clean air with less foreign matter is able to be taken into the breather pipe 52 from the outlet 52B.

In the present preferred embodiment, the drain pipe 54, which is located lower than the canister 54 and branches from the breather pipe 52 and then extends downward, includes the drain hole 54A at a lower end thereof. Therefore, even when liquid fuel inside the fuel tank 12 or water from the outside flows into the canister 45, it is possible to make these liquids flow from the breather pipe 52 to the drain pipe 54 and be discharged to the outside of the straddled vehicle 1 from the drain hole 54A. Therefore, it is possible to prevent the occurrence of liquid pooling in the fuel system 40.

In the present preferred embodiment, the backflow valve 55 makes it possible to prevent water outside the straddled vehicle 1 from flowing into the drain pipe 54 from the drain hole 54A. Therefore, since it is possible to prevent water from flowing into the breather pipe 52 from the drain pipe 54, it is possible to prevent water from entering the inside of the canister 45 from the drain pipe 54.

Figure 15:
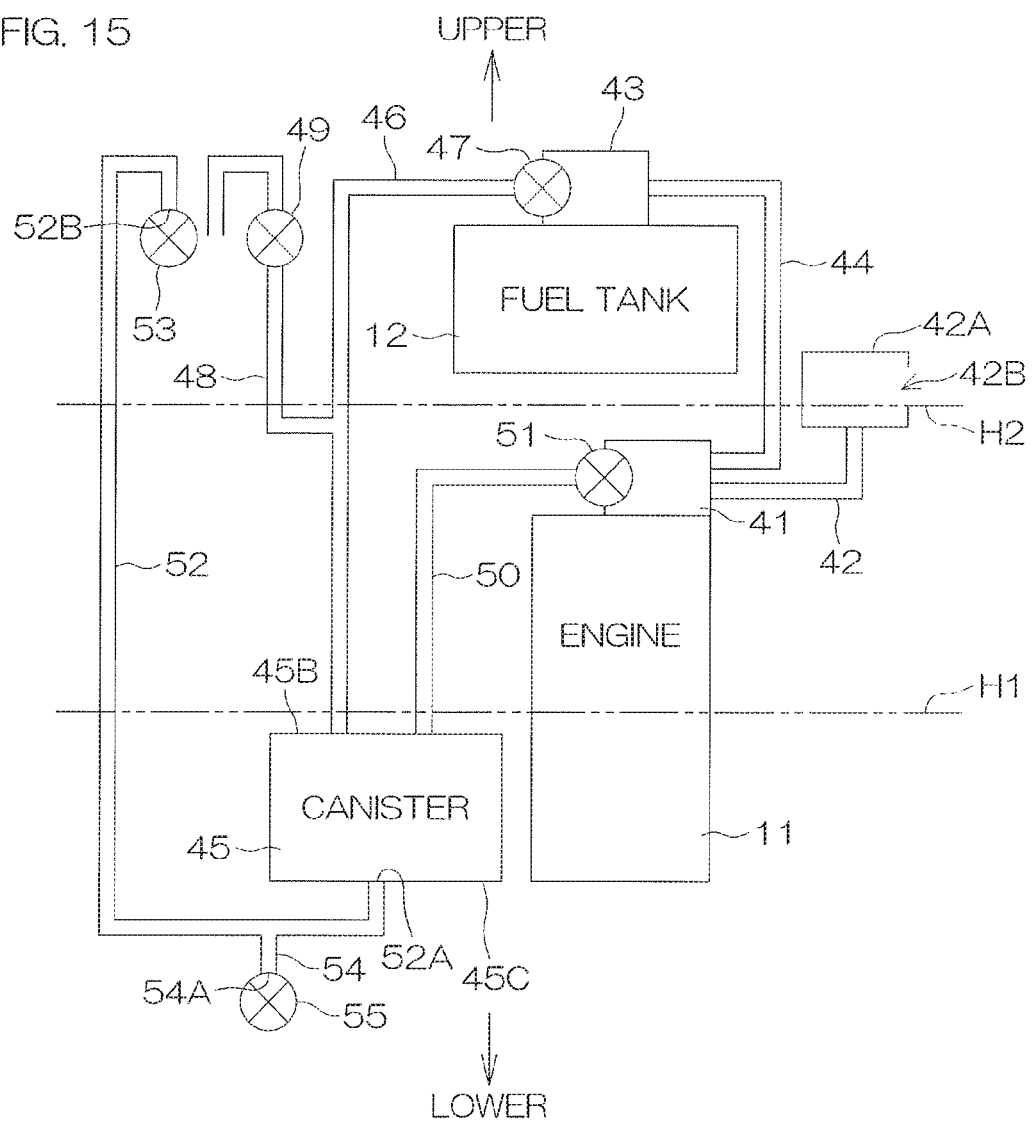
FIG. 15 is a schematic view to describe a fuel system according to a second preferred embodiment of the present invention.

FIG. 15 and FIG. 16 are schematic views to describe fuel systems 40 according to a second preferred embodiment and a third preferred embodiment of the present invention. Hereinafter, an element functionally the same as an element described in relation to the first preferred embodiment described above is provided with the same reference number, and detailed description of such an element shall be omitted. The purge cut valve 51 may be integral with the throttle body 41 as in the second preferred embodiment shown in FIG. 15. Accordingly, a bracket to fix the position of the purge cut valve 51 and a pipe, etc., to connect the throttle body 41 and the purge cut valve 51 are able to be omitted.

The purge cut valve 51 needs to be located higher than the first horizontal line H1 passing through upper ends of the front wheels 3 and the rear wheels 6, however, the purge cut valve 51 may be located higher than the second horizontal line H2 passing through a lower end of the air inlet 42B of the intake box 42A and the throttle body 41 as in the third preferred embodiment shown in FIG. 16.

Although preferred embodiments of the present invention have been described above, the present invention is not restricted to the contents of these preferred embodiments and various modifications are possible within the scope of the present invention.

In the preferred embodiments described above, the straddled vehicle 1 for sports traveling is described, however, a straddled vehicle according to a preferred embodiment of the present invention may be a utility vehicle belonging to an arbitrary category without being limited to a vehicle for sports traveling.

The straddled vehicle 1 preferably includes a pair of front wheels 3 and a pair of rear wheels 6. However, the straddled vehicle 1 according to a preferred embodiment of the present invention may include one or three or more front wheels 3, and one or three or more rear wheels 6.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddled vehicle comprising:
a vehicle body frame that supports a front wheel and a rear wheel;
a seat fixed to the vehicle body frame and on which an occupant sits;
an engine including a crankshaft that rotates around a crank axis extending in the left-right direction and located lower than the seat;
a fuel tank that stores a fuel for the engine, and located farther forward than the seat and higher than the engine;
a canister connected to the fuel tank through a gas pipe, that adsorbs vaporized gas generated by evaporation of the fuel inside the fuel tank, and located farther forward than the crank axis and lower than the fuel tank;
a breather pipe including an inlet connected to the canister and an outlet that opens to the atmosphere;
an intake valve located higher than upper ends of the front wheel and the rear wheel and that opens and closes the outlet, or, an air cleaner located higher than upper ends of the front wheel and the rear wheel and that traps foreign matter from air flowing from the outlet to the inside of the breather pipe; and a drain pipe located lower than the canister, that branches from the breather pipe and extends downward, and includes a drain hole at a lower end thereof; wherein the canister is located directly in front of the engine.

2. The straddled vehicle according to claim 1, further comprising:
a swing arm located farther rearward than the engine and attached to the vehicle body frame in a swingable manner, and to which the rear wheel is attached.

3. The straddled vehicle according to claim 1, further comprising:
a cover located so as to sandwich the canister with the engine, and that covers at least a portion of the canister from a lateral outer side of the straddled vehicle.

4. The straddled vehicle according to claim 3, further comprising:
a clip located at a lateral inner side of the straddled vehicle with respect to the cover, and that connects the gas pipe to the canister.

5. The straddled vehicle according to claim 1, further comprising:
a fuel pump that pumps the fuel out of the fuel tank and supplies the fuel to the engine; and
a shut-off valve integral with the fuel pump, and that shuts the gas pipe off in response to the straddled vehicle tilting at a predetermined angle or more with respect to the vertical direction.

6. The straddled vehicle according to claim 1, further comprising:
an intake passage including an air inlet and that supplies air from the air inlet to the engine; wherein
the outlet is located at the same height as the air inlet, or located higher than the air inlet.

7. The straddled vehicle according to claim 1, further comprising:
an exterior component that covers the outlet.

8. The straddled vehicle according to claim 1, further comprising:
a backflow valve that prevents backflow through the drain hole into the drain pipe.

9. The straddled vehicle according to claim 1, further comprising:
a throttle body located higher than upper ends of the front wheel and the rear wheel, and connected to the engine;
a purge pipe that connects the canister and the throttle body, and that supplies vaporized gas inside the canister to the throttle body; and
a purge cut valve integral with the throttle body and that opens and closes the purge pipe.

10. The straddled vehicle according to claim 1, wherein the canister is located at a height lower than an upper end of the engine.

* * * * *